United States Patent
Siah et al.

(10) Patent No.: US 7,315,013 B2
(45) Date of Patent: *Jan. 1, 2008

(54) OPTICAL NAVIGATION USING ONE-DIMENSIONAL CORRELATION

(75) Inventors: Tiong Heng Siah, Johor (MY); Heng Yew Kong, Petaling Jaya (MY)

(73) Assignee: Avago Technologies ECBU IP (Singapore) Pte Ltd., Singapore (SG)

( * ) Notice: Subject to any disclaimer, the term of this patent is extended or adjusted under 35 U.S.C. 154(b) by 575 days.

This patent is subject to a terminal disclaimer.

(21) Appl. No.: 10/870,412

(22) Filed: Jun. 17, 2004

(65) Prior Publication Data

US 2005/0283307 A1    Dec. 22, 2005

(51) Int. Cl.
*H01L 27/00* (2006.01)

(52) U.S. Cl. ............ 250/208.1; 701/200; 345/166; 382/305; 382/106; 382/107; 250/221; 257/E27.133; 356/520

(58) Field of Classification Search ............ 250/208.1, 250/221; 701/200; 345/166; 382/305, 106–107; 257/E27.133; 356/520
See application file for complete search history.

(56) References Cited

U.S. PATENT DOCUMENTS

| | | | |
|---|---|---|---|
| 4,794,384 A | | 12/1988 | Jackson |
| 5,248,873 A | * | 9/1993 | Allen et al. ............... 250/208.1 |
| 5,578,813 A | | 11/1996 | Allen et al. |
| 5,578,817 A | * | 11/1996 | Bidiville et al. ............ 250/221 |
| 5,644,139 A | | 7/1997 | Allen et al. |
| 5,703,356 A | * | 12/1997 | Bidiville et al. ............ 250/221 |
| 5,786,804 A | | 7/1998 | Gordon |
| 5,854,482 A | * | 12/1998 | Bidiville et al. ............ 250/221 |
| 5,965,879 A | * | 10/1999 | Leviton ................. 250/231.13 |
| 6,084,574 A | * | 7/2000 | Bidiville ..................... 345/166 |
| 6,093,923 A | * | 7/2000 | Vock et al. .............. 250/206.1 |
| 6,124,587 A | * | 9/2000 | Bidiville et al. ............ 250/221 |
| 6,218,659 B1 | * | 4/2001 | Bidiville et al. ............ 250/221 |
| 6,256,016 B1 | * | 7/2001 | Piot et al. .................... 345/166 |
| 6,281,882 B1 | | 8/2001 | Gordon et al. |
| 6,320,173 B1 | * | 11/2001 | Vock et al. .............. 250/206.1 |
| 6,603,111 B2 | | 8/2003 | Dietz et al. |
| 6,657,184 B2 | * | 12/2003 | Anderson et al. .......... 250/221 |
| 6,770,863 B2 | | 8/2004 | Walley |

(Continued)

FOREIGN PATENT DOCUMENTS

JP            05115040 A    *    5/1993

(Continued)

OTHER PUBLICATIONS

Optical computing techniques for image/video compression, Yoshida, A.; Reif, J.H.; Proceedings of the IEEE, vol. 82, Issue 6, Jun. 1994 pp. 948-954, Digital Object Identifier 10.1109/5.286198.*

(Continued)

*Primary Examiner*—Cuong Nguyen (57) ABSTRACT

A technique for optical navigation involves summing intensity values from a photodetector array on a per-column and a per-row basis for both reference image data and sample image data and then performing separate one-dimensional cross-correlations on the per-column sums and on the per-row sums to separately determine displacement in the x and y directions, respectively.

20 Claims, 6 Drawing Sheets

U.S. PATENT DOCUMENTS

| | | | |
|---|---|---|---|
| 6,823,077 B2* | 11/2004 | Dietz et al. | 382/107 |
| 7,176,432 B2* | 2/2007 | Komiya | 250/208.1 |
| 2002/0180880 A1 | 12/2002 | Bean et al. | |
| 2003/0001078 A1 | 1/2003 | Baharav et al. | |
| 2003/0103037 A1 | 6/2003 | Rotzoll | |
| 2004/0051798 A1 | 3/2004 | Kakarala et al. | |
| 2005/0195163 A1 | 9/2005 | Grewal et al. | |
| 2005/0206614 A1* | 9/2005 | Brosnan et al. | 345/156 |

FOREIGN PATENT DOCUMENTS

| | | |
|---|---|---|
| WO | WO 00/38103 | 6/2000 |

OTHER PUBLICATIONS

Optics and supercomputing, Berra, P.B.; Ghafoor, A.; Guizani, M.; Marcinkowski, S.J.; Mitkas, P.A.; Proceedings of the IEEE vol. 77, Issue 12, Dec. 1989 pp. 1797-1815 , Digital Object Identifier 10.1109/5.48824.*

High-speed CMOS wavefront sensor with resistive-ring networks of winner-take-all circuits, Nirmaier, T.; Diez, C.A.; Bille, J.F.; Solid-State Circuits, IEEE Journal of, vol. 40, Issue 11, Nov. 2005 pp. 2315-2322, Digital Object Identifier 10.1109/JSSC.2005.857350.*

Optimal projection for multidimensional signal detection, Chu, P.L.; Acoustics, Speech, and Signal Processing [see also IEEE Transactions on Signal Processing], IEEE Transactions on, vol. 36, Issue 5, May 1988 pp. 775-786 Digital Object Identifier 10.1109/29.1587.*

An improved video-based computer tracking systems for soft biomaterials testing, Downs, J.; Halperin, H.R.; Humphrey, J.; Yin, F.; Biomedical Engineering, IEEE Transactions on, vol. 37, Issue 9, Sep. 1990 pp. 903-907, Digital Object Identifier 10.1109/10.58600.*

Source width insensitive optical sensor, Williamson, I.C.; Balasubramanian, S.; Haslett, J.W.; Trofimenkoff, F.N.; Instrumentation and Measurement, IEEE Transactions on, vol. 43, Issue 6, Dec. 1994 pp. 848-856 Digital Object Identifier 10.1109/19.368086.*

A photodiode cell for applications to position and motion estimation sensors, Tartagni, M.; Franchi, E.; Guerrieri, R.; Baccarani, G.; Industrial Electronics, IEEE Transactions on, vol. 43, Issue 1, Feb. 1996 pp. 200-206, Digital Object Identifier 10.1109/41.481426.*

Automatic target recognition organized via jump-diffusion algorithms, Miller, M.I.; Grenander, U.; OSullivan, J.A.; Snyder, D.L.; Image Processing, IEEE Transactions on, vol. 6, Issue 1, Jan. 1997 pp. 157-174, Digital Object Identifier 10.1109/83.552104.*

Random addressable 2048x2048 active pixel image sensor, Scheffer, D.; Dierickx, B.; Meynants, G.; Electron Devices, IEEE Transactions on, vol. 44, Issue 10, Oct. 1997 pp. 1716-1720, Digital Object Identifier 10.1109/16.628827.*

A dual pixel-type array for imaging and motion centroid localization, Clapp, M.A.; Ralph Etienne-Cummings; Sensors Journal, IEEE, vol. 2, Issue 6, Dec. 2002 pp. 529-548, Digital Object Identifier 10.1109/JSEN.2002.806894.*

A restraint-free small animal SPECT imaging system with motion tracking, Weisenberger, A.G.; Gleason, S.S.; Goddard, J.; Kross, B.; Majewski, S.; Meikle, S.R.: Paulus, M.J.; Pomper, M.; Popov, V.; Smith, M.F.; Welch, B.L.; Wojcik, R.; Nuclear Science, IEEE Transactions onvol. 52, Issue 3, Part 1, Jun. 2005 pp. 638-644.*

Highway overhead structure detection using video image sequences, Yang Chen; Intelligent Transportation Systems, IEEE Transactions on, vol. 4, Issue 2, Jun. 2003 pp. 67-77, Digital Object Identifier 10.1109/TITS.2003.821209.*

Object location and centroiding techniques with CMOS active pixel sensors, Burns, R.D.; Shah, J.; Canaan Hong; Pepic, S.; Ji Soo Lee; Homsey, R.I.; Thomas, P.; Electron Devices, IEEE Transactions on, vol. 50, Issue 12, Dec. 2003 pp. 2369-2377, Digital Object Identifier 10.1109/TED.2003.819260.*

A biologically inspired modular VLSI system for visual measurement of self-motion, Higgins, C.M.; Shams,;S.A.; Sensors Journal, IEEE, vol. 2, Issue 6, Dec. 2002 pp. 508-528, Digital Object Identifier 10.1109/JSEN.2002.807304.*

CMOS contact imager for monitoring cultured cells, Honghao Ji; Abshire, P.A.; Urdaneta, M.; Smela, E.; Circuits and Systems, 2005. ISCAS 2005. IEEE International Symposium on, May 23-26, 2005 pp. 3491-3494 vol. 4, Digital Object Identifier 10.1109/ISCAS.2005.1465381.*

English Translation of German Office action dated Mar. 13, 2007 for German Patent Application No. 102005004861.7-53.

Orazio Svelto article entitled "Properties of Laser Beams", 1998, 1989, 1982, 1976, pp. 9-10.

Bruce D. Lucas et al., article entitled "An Iterative Registration Technique with an application to Stereo Vision", pp. 674-679, Aug. 24-28, 1981.

* cited by examiner

OPTICAL NAVIGATION USING ONE-DIMENSIONAL CORRELATION

BACKGROUND OF THE INVENTION

Optical navigation upon arbitrary surfaces produces motion signals indicative of relative movement along the directions of coordinate axes, and is becoming increasingly prevalent. It is used, for instance, in optical computer mice and fingertip tracking devices to replace conventional mice and trackballs for the position control of screen pointers in windowed user interfaces for computer systems. It has many advantages, among which are the lack of moving parts that accumulate dirt and suffer the mechanical wear and tear of use. Another advantage of an optical mouse is that it does not need a mouse pad, since it is generally capable of navigating upon arbitrary surfaces, so long as they are not optically featureless.

Optical navigation operates by tracking the relative displacement of images. A two-dimensional view of a portion of a surface is focused upon an array of photodetectors, whose outputs are digitized and stored as a reference image in a corresponding array of memory. A brief time later a sample image is also digitized. If there has been no motion between the image capture events, then the sample image and the reference image are identical (or very nearly so). That is, the stored arrays appear to match up. If, on the other hand, there has been some motion between the image capture events, then the sample image will appear to have shifted within its borders, and the digitized arrays will no longer match. The matching process that is used to align similar features of two images is termed "correlation" and typically involves a two-dimensional cross-correlation between the reference image and the sample image. A two-dimensional cross-correlation between the reference image and the sample image compares intensity values of the images on a pixel-by-pixel basis to determine relative displacement between the two sets of image data.

Because two-dimensional cross-correlation is performed on a pixel-by-pixel basis, it requires a large number of arithmetic computations to compare all of the data points of the two sets of image data. For example, a 30 by 30 photodetector array has 900 pixels (i.e., individual photodetectors), which produce 900 different data points that must be cross-correlated between the two sets of image data. Generally, the larger the number of arithmetic computations that are required to perform the cross-correlation, the more time is required to determine the relative displacement. The required processing time can be reduced by adding more processing power. However, more processing power requires more space on a processing integrated circuit (IC) and consumes more power during operation, both of which are costly resources that are to be conserved whenever possible.

In view of this, what is needed is a low-cost and accurate technique for optical navigation.

SUMMARY OF THE INVENTION

A technique for optical navigation involves summing intensity values from a photodetector array on a per-column and a per-row basis for both reference image data and sample image data and then performing separate one-dimensional cross-correlations on the per-column sums and on the per-row sums to separately determine displacement in the x and y directions, respectively. Because the intensity values from the photodetector array are summed on a per-column and per-row basis, the two-dimensional photodetector array is effectively reduced to two one-dimensional arrays that can be matched using two one-dimensional cross-correlations. The two one-dimensional cross-correlations require far less arithmetic operations than a comparable two-dimensional cross-correlation.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar element.

DETAILED DESCRIPTION

Figure 1:
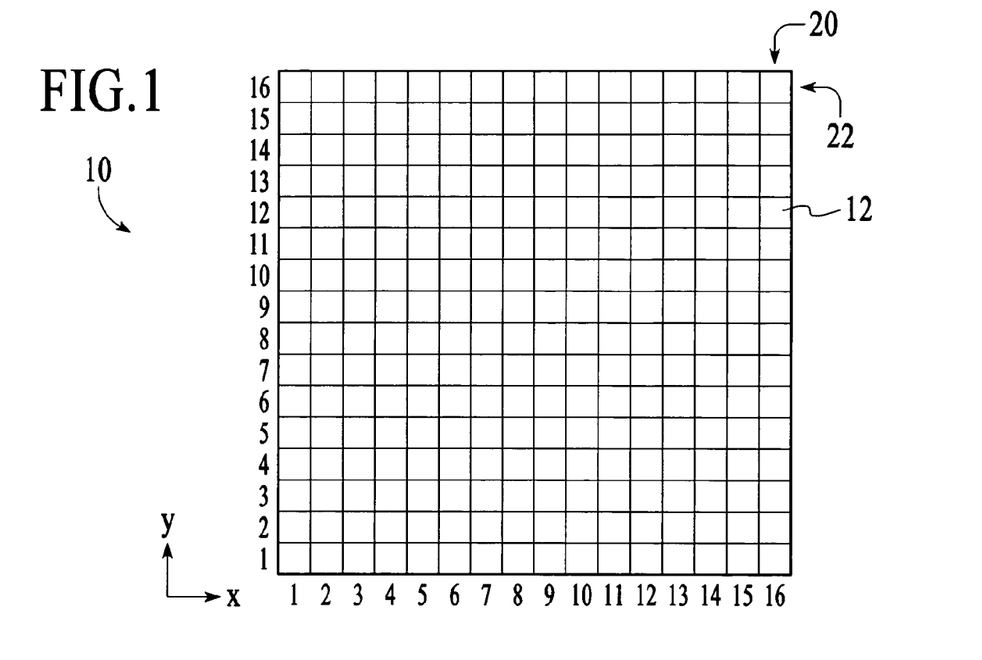
FIG. 1 depicts an image sensor that is formed by an array of photodetectors.

FIG. 1 depicts an image sensor 10 that is formed by an array of photodetectors 12, where each of the individual photodetectors is often referred to as a "pixel." The photodetector array is formed in columns 20 and rows 22 of photodetectors. For description purposes, the columns are parallel to the y-axis and the rows are parallel to the x-axis as indicated in FIG. 1. The photodetector array of FIG. 1 includes a 16×16 array of photodetectors, however, it should be noted that this is for example purposes only. Actual photodetector arrays used in optical navigations systems may range, for example, from 20×20 to 30×30 arrays. As is known in the field, images obtained by the photodetector array are stored as digital image data. In optical navigation applications, the image data is often stored in memory arrays that correspond to the photodetector array.

Figure 2:
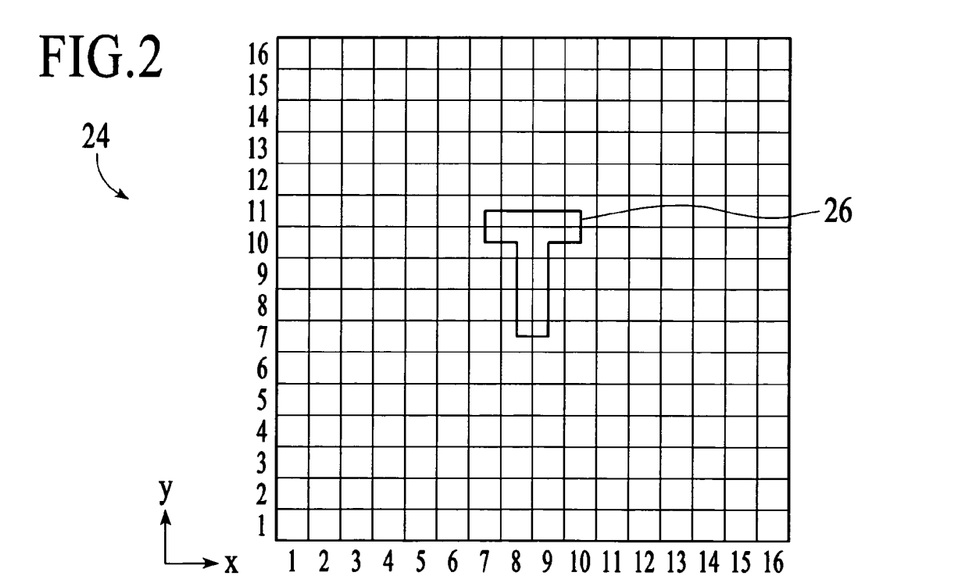
FIG. 2 depicts a set of reference image data that is obtained with the image sensor of FIG. 1 relative to the image sensor's photodetector array.
Figure 3:
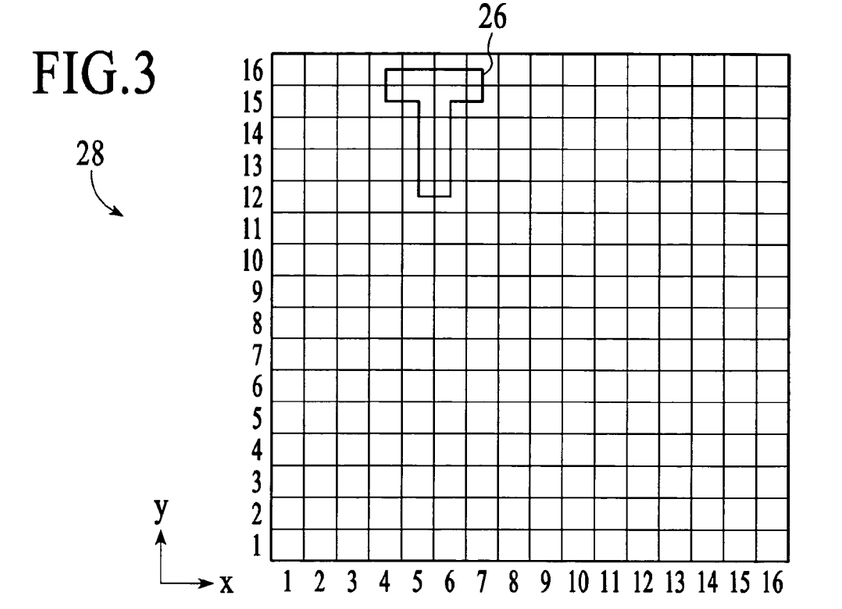
FIG. 3 depicts a set of sample image data that is obtained with the image sensor of FIG. 1 relative to the image sensor's photodetector array.

The basic concept of relative displacement determination in an optical navigation system is described with reference to FIGS. 2-4. FIG. 2 depicts a first set of image data 24 that is obtained with the image sensor of FIG. 1 relative to the image sensor's photodetector array. For description purposes, the image data includes a T-shaped image feature 26. Although a T-shaped image feature is depicted for description purposes, the image data could include any combination of random or non-random image features. Throughout the description, the first set of image data is referred to as the "reference image data." In this example, the reference image data is obtained at some time, $t_1$.

At some later time, $t_2$, a second set of image data is obtained by the image sensor. Throughout the description, the second set of image data is referred to as the sample image data. FIG. 3 depicts sample image data 28 that is obtained with the image sensor of FIG. 1 relative to the image sensor's pixel array. As depicted in FIG. 3, the T-shaped image feature 26 has moved relative to the photodetector array in comparison to the T-shaped image feature in FIG. 2. The movement of the T-shaped image feature is caused by movement that occurs between the image sensor and the imaged surface between image capture events. The relative movement between the image sensor and the imaged surface can be caused by movement of the image sensor relative to a stationary imaged surface, movement of an imaged surface relative to the stationary image sensor, or by movement of both the image sensor and the imaged surface. In an embodiment, image data may be captured at a rate of 1,500 images per second.

Cross-correlation is used to determine the relative displacement between the reference image data 24 and the sample image data 26. The cross-correlation process tries to find the best match between the reference image data and the sample image data to determine relative displacement in the x and y directions. The best match is found by matching image features in the two sets of image data. In one example, cross-correlation of digital image data involves "moving" the reference image data to different positions relative to the sample image data and calculating a cross-correlation coefficient at each different position. The location with the highest cross-correlation coefficient indicates the closest correspondence between the reference and sample image data. FIG. 4 depicts the reference and sample image data aligned such that the T-shaped image features 26 of the two sets of image data match. When the image features of the two sets of image data are matched, the relative displacement between the reference image data and the sample image data is evident as depicted in FIG. 4 and can be easily calculated. The relative displacement between the reference image data and the sample image data can be described in terms of displacement in the y-direction ($\delta y$) and displacement in the x-direction ($\delta x$).

Figure 4:
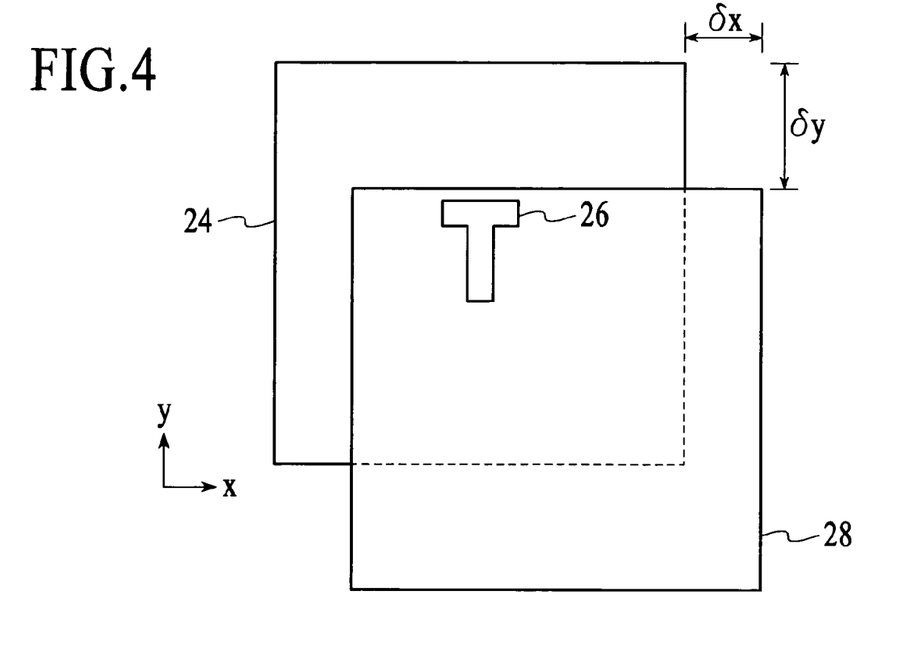
FIG. 4 depicts the reference and sample image data from FIGS. 2 and 3 aligned such that the T-shaped image features of the two sets of image data match.

The relative displacement between the reference image data 24 and the sample image data 26 as shown in FIG. 4 is typically determined using a two-dimensional cross-correlation that involves pixel-by-pixel comparisons between the reference image data and the sample image data. The two-dimensional cross-correlation is a resource intensive operation in terms of processing time, IC real estate, and power consumption. In accordance with the invention, the relative displacement between reference image data and sample image data in an optical navigation system is determined using a technique that involves a pair of one-dimensional cross-correlations instead of a two-dimensional cross-correlation. According to the technique, the intensity values of the individual photodetectors are summed separately on a per-column and a per-row basis for both the reference image data and the sample image data and then one-dimensional cross-correlations are performed separately on the per-column sums and on the per-row sums to separately determine displacement in the x and y directions, respectively. Because the intensity values of the photodetectors are summed on a per-column and per-row basis, the two-dimensional photodetector array is effectively reduced to two one-dimensional arrays that can be matched using two one-dimensional cross-correlations. The two one-dimensional cross-correlations require far less arithmetic operations than a comparable two-dimensional cross-correlation.

Figure 5:
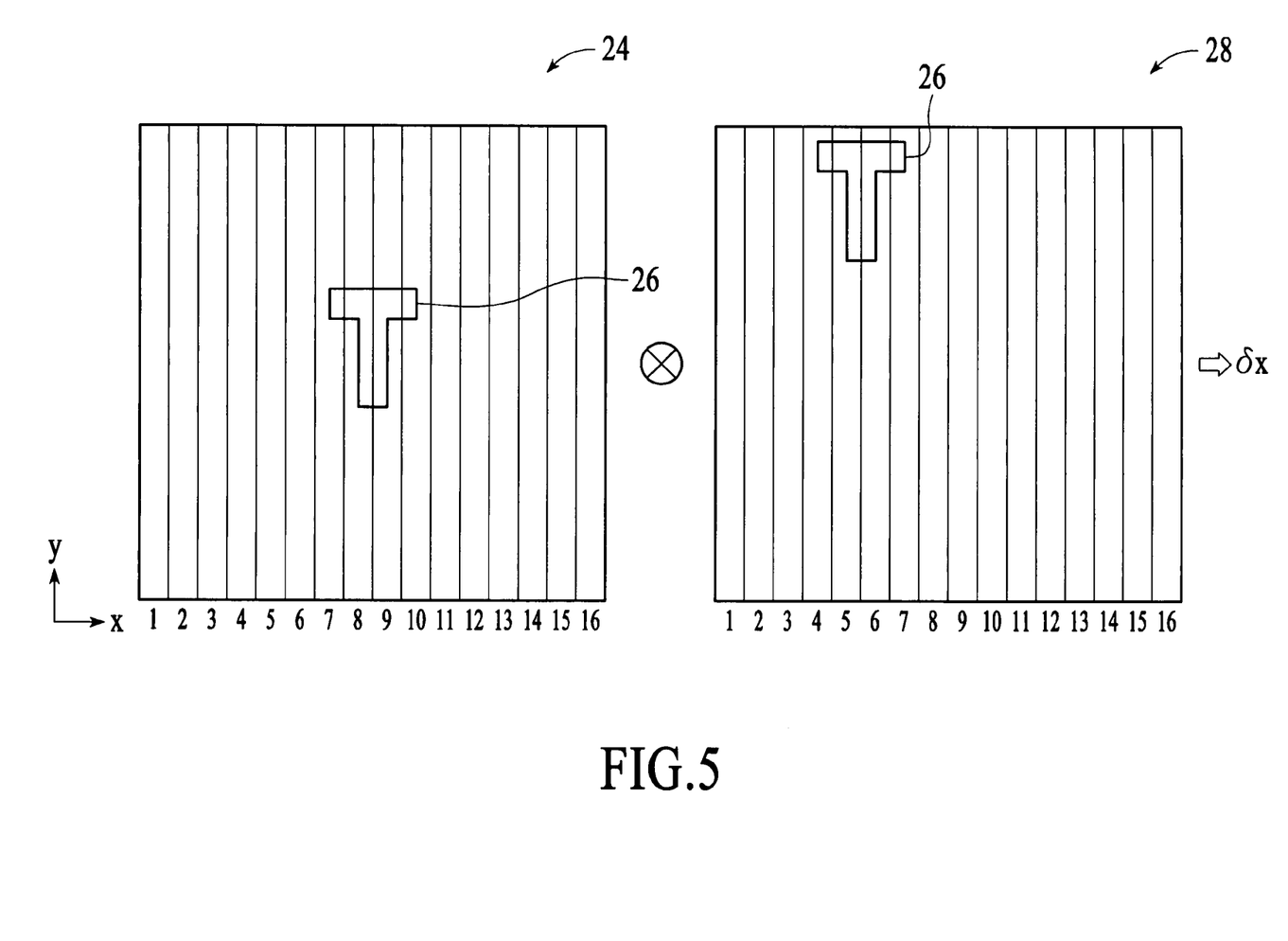
FIG. 5 graphically depicts the columns over which intensity values of individual photodetectors are summed on a per-column basis for both the reference image data and the sample image data.

FIG. 5 graphically depicts the process of determining the relative displacement between the reference image data 24 and the sample image data 28 in the x-direction. More specifically, FIG. 5 depicts the columns over which intensity values of the individual photodetectors are summed on a per-column basis for both the reference image data and the sample image data. In the example of FIG. 5, the columns are identified as columns 1 through 16 and the sum of each column represents the total intensity of all of the photodetectors in the respective column. The sums from the reference image data and the sample image data are cross-correlated to determine the relative displacement in the x-direction. The cross-correlation is a one-dimensional cross-correlation that involves matching the summed column values for the reference and sample image data.

Figure 6:
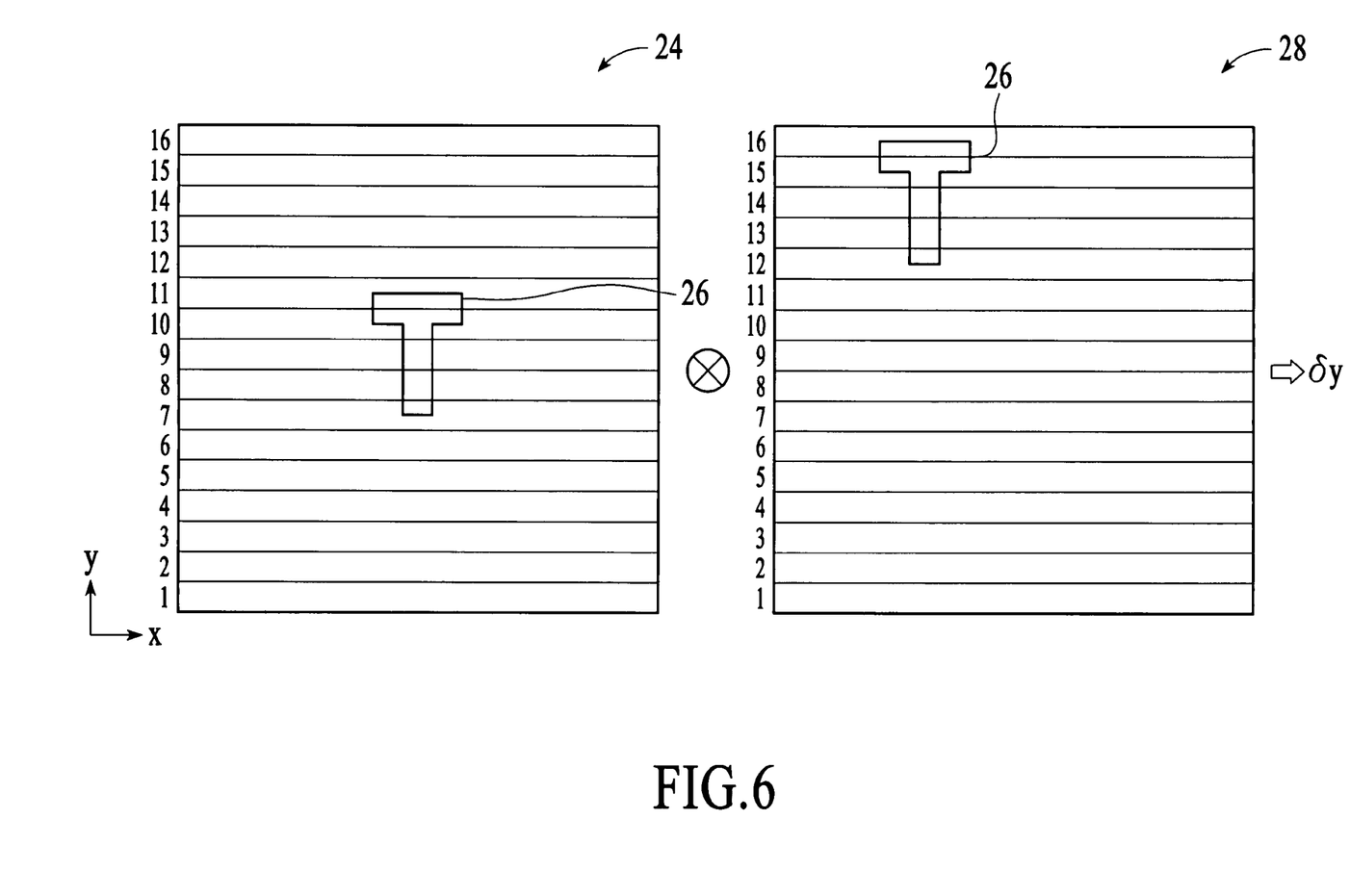
FIG. 6 graphically depicts the rows over which intensity values of individual photodetectors are summed on a per-row basis for both the reference image data and the sample image data.

FIG. 6 graphically depicts the process of determining the relative displacement between the reference image data 24 and the sample image data 28 in the y-direction. More specifically, FIG. 6 depicts the rows over which intensity values of the individual photodetectors are summed on a per-row basis for both the reference image data and the sample image data. In the example of FIG. 6, the rows are identified as rows 1 through 16 and the sum of each row represents the total intensity of all of the photodetectors in the respective rows. The sums from the reference image data and the sample image data are then cross-correlated to determine the relative displacement in the y-direction. As in the x-direction operation, the cross-correlation is a one-dimensional cross-correlation that involves matching the summed row values from the reference and sample image data.

Figure 7:
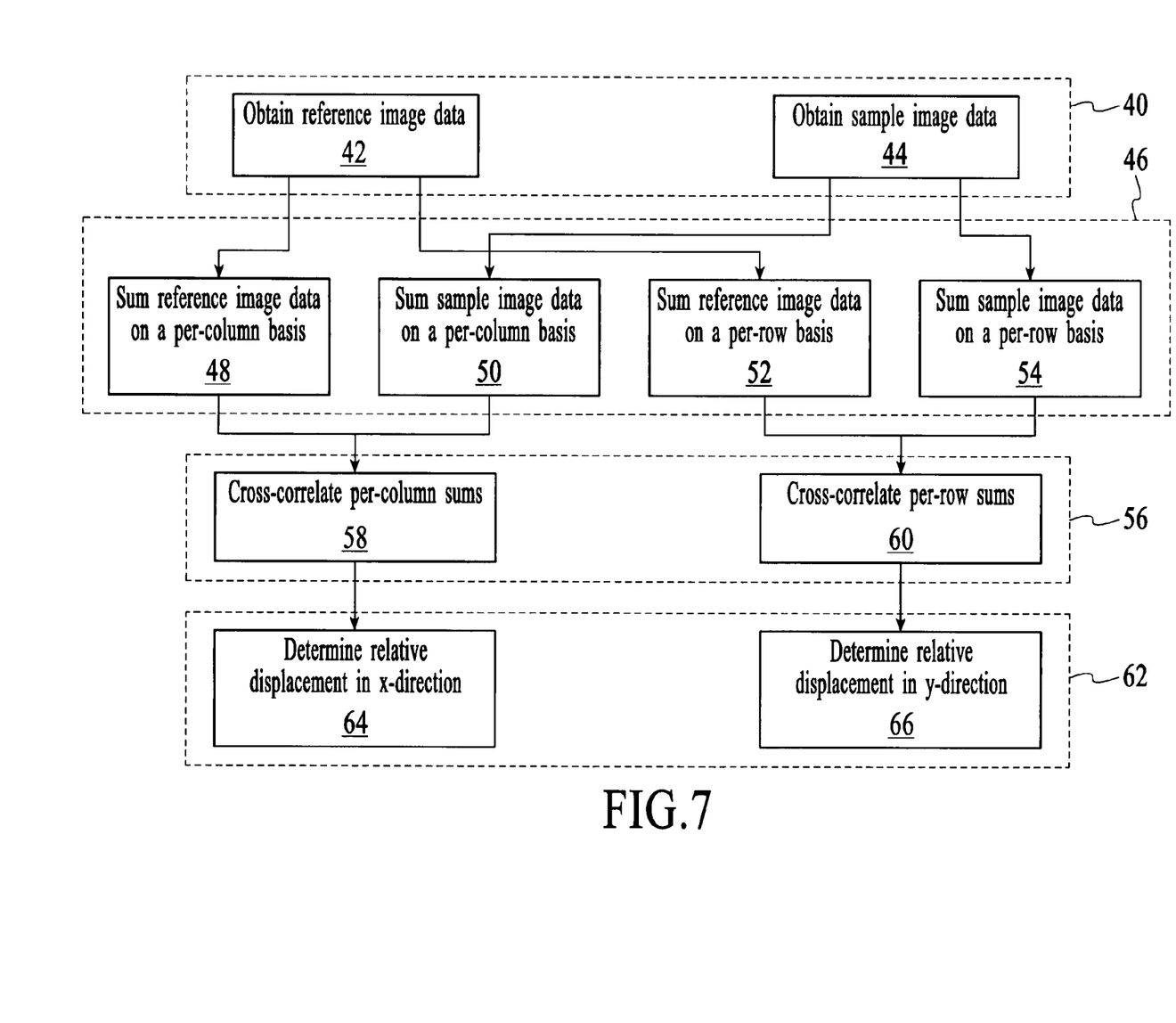
FIG. 7 depicts a process flow diagram of an optical navigation method in accordance with the invention.

FIG. 7 depicts a process flow diagram of the above-described optical navigation method. The first operation (as indicated by dashed line box 40) involves image capture. Specifically, during image capture, reference image data and sample image data are obtained 42 and 44. The second operation (as indicated by dashed line box 46) involves pre-processing of the image data. Specifically, the pre-processing involves summing the reference image data 48 on a per-column basis, summing the sample image data on a per-column basis 50, summing the reference image data on a per-row basis 52, and summing the sample image data on a per-row basis 54. After the data is summed on a per-column and per-row basis, the next operation (as indicated by dashed line box 56) involves the one-dimensional cross-correlation. Specifically, the per-column sums of the reference and sample image data are cross-correlated 58 and separately the per-row sums of the reference and sample image data are cross-correlated 60. The last operation (as indicated by dashed line box 62) involves determining the relative displacement. Specifically, the relative displacement between the reference and sample image data in the x-direction ($\delta x$) is determined 64 from the cross-correlation of the per-column sums and the relative displacement between the reference and sample image data in the y-direction ($\delta y$) is determined 66 from the cross-correlation of the per-row sums.

Because the cross-correlations are done separately using per-column and per-row sums, there are far less computations to be made using the above-described technique than using a two-dimensional correlation. One-dimensional cross-correlation computations involve simple summing of the columns and rows and then cross-correlation of the columns and the rows.

In the example described above with reference to FIGS. 5 and 6, each of the one-dimensional cross-correlations involve two sets of 16 values. That is, the one-dimensional cross-correlation of the column values compares 16 values from the reference image data to 16 values from the sample image data and the one-dimensional cross-correlation of the row values compares 16 values from the reference image data to 16 values from the sample image data. The total number of unique values involved in the two cross-correlation operations using this technique is 64 (4×16=64) unique values. In contrast, a two-dimensional cross-correlation of the same sets of reference and sample image data involves cross-correlating the 256 (16×16=256) unique values of the reference image data with the 256 unique values of the sample image data for a total of 512 unique values. The magnitude of the disparity between the number of unique values increases as the size of the photodetector array increases.

Figure 8:
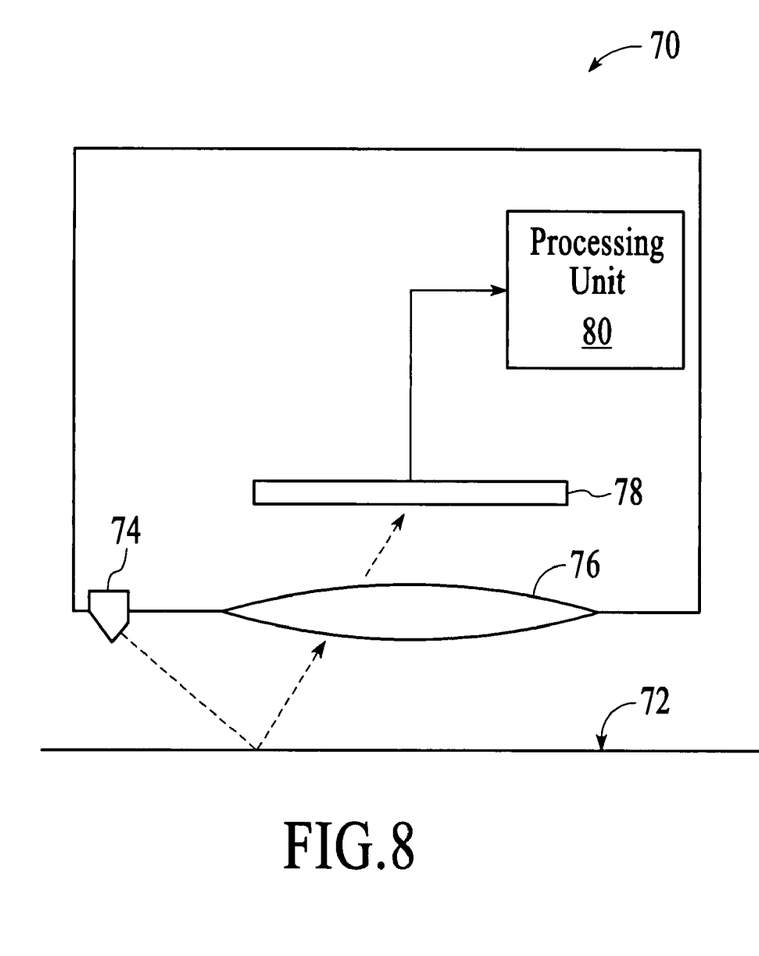
FIG. 8 depicts a system for processing image data for optical navigation.

FIG. 8 depicts an example of an optical navigation system 70 relative to a surface 72 that is used for navigation. The optical navigation system includes a light source 74, optics 76, an image sensor 78, and a processing unit 80. The light source (e.g., a light emitting diode) emits light, which illuminates the surface and is reflected towards the optical navigation system. The reflected light is collected by the optics and directed towards the image sensor. The image sensor detects the received light and outputs image data to the processing unit. For example, the image sensor captures reference image data and at some later time, sample image data. The processing unit processes the image data as described above to determine relative displacement between the reference image data and the sample image data.

Figure 9:
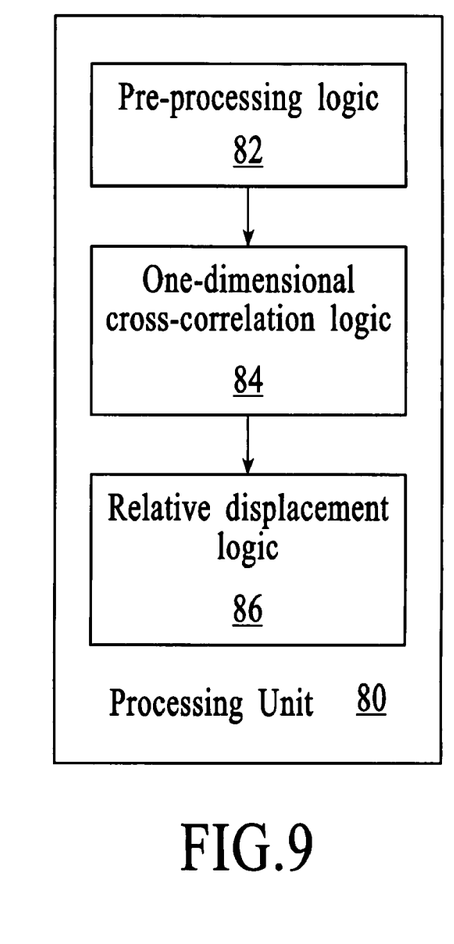
FIG. 9 depicts a detailed view of the processing unit from FIG. 8.

FIG. 9 depicts a more detailed view of the processing unit 80 from FIG. 8. The processing unit includes pre-processing logic 82, one-dimensional cross-correlation logic 84, and relative displacement logic 86. The pre-processing logic performs the summing operations as described above, the one-dimensional cross-correlation logic performs the one-dimensional cross-correlation operations as described above, and the relative displacement logic performs the relative displacement determination operations as described above. The functional elements of the processing unit may be implemented in hardware, software, firmware, or any combination thereof. In an embodiment, the pre-processing logic and the one-dimensional cross-correlation logic are implemented in hardware while the relative displacement logic is implemented in firmware.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation method comprising:
    obtaining first image data from an image sensor comprising an m×n array of photodetectors with m being greater than one and n being greater than one;
    obtaining second image data from the image sensor;
    summing, at a pre-processing hardware circuit, intensity values of the first image data on a per-column basis and on a per-row basis;
    summing, at the pre-processing hardware circuit, intensity values of the second image data on a per-column basis and on a per-row basis;
    cross-correlating, at a one-dimensional cross-correlation hardware circuit, the per-column sums of the first image data and the second image data;
    cross-correlating, at the one-dimensional cross-correlation hardware circuit, the per-row sums of the first image data and the second image data;
    determining relative displacement between the first and second image data in a first direction in response to the cross-correlation of the per column sums;
    determining relative displacement between the first and second image data in a second direction in response to the cross-correlation of the per-row sums; and
    using the relative displacement in the first and second directions to track the movement of an optical navigation system relative to a navigation surface.

2. The optical navigation method of claim 1 wherein:
    the first direction is perpendicular to the columns over which the per-column intensity values are summed; and
    the second direction is perpendicular to the rows over which the per-row intensity values are summed.

3. The optical navigation method of claim 1 wherein summing the intensity values on a per-column basis comprises adding the intensity values from image sensor photodetectors in the same column.

4. The optical navigation method of claim 3 wherein summing the intensity values on a per-row basis comprises adding the intensity values from image sensor photodetectors in the same row.

5. The optical navigation method of claim 1 wherein the first image data is obtained before the second image data is obtained.

6. The optical navigation method of claim 1 wherein the cross-correlating of the per-column sums is a one-dimensional cross-correlation and wherein the cross-correlating of the per-row sums is a one-dimensional cross-correlation.

7. The optical navigation method of claim 1 wherein the first image data and the second image data are obtained from a two-dimensional photodetector array.

8. The optical navigation method of claim 7 wherein the first and second image data comprises digital image data.

9. An optical navigation method comprising:
    obtaining first image data that includes an array of intensity values, where the array of intensity values is obtained from an image sensor comprising an m×n array of photodetectors with m being greater than one and n being greater than one;
    obtaining second image data that includes an array of intensity values, where the array of intensity values is obtained from the image sensor;
    summing, at a pre-processing hardware circuit, intensity values of the first image data on a per-column basis to create per-column intensity value sums;
    summing, at the pre-processing hardware circuit, intensity values of the second image data on a per-column basis to create per-column intensity value sums;
    performing, at a one-dimensional cross-correlation hardware circuit, a one-dimensional cross-correlation on the per-column intensity value sums of the first image data and the second image data;
    determining one-dimensional displacement between the first and second image data in a first direction in response to the cross-correlation;
    summing, at the pre-processing hardware circuit, intensity values of the first image data on a per-row basis to create per-row intensity value sums;

summing, at a pre-processing hardware circuit, intensity values of the second image data on a per-row basis to create per-row intensity value sums;

performing, at the one-dimensional cross-correlation hardware circuit, a one-dimensional cross-correlation on the per-row intensity value sums of the first image data and the second image data;

determining one-dimensional displacement between the first and second image data in a second direction in response to the cross-correlation; and using the one-dimensional displacement in the first and second directions to track the movement of an optical navigation system relative to a navigation surface.

10. The optical navigation method of claim 9 wherein:

the first direction is perpendicular to the columns over which the per-column intensity values are summed; and the second direction is perpendicular to the rows over which the per-row intensity values are summed.

11. The optical navigation method of claim 9 wherein summing the intensity values on a per-column basis comprises adding the intensity values from image sensor photodetectors in the same column.

12. The optical navigation method of claim 11 wherein summing the intensity values on a per-row basis comprises adding the intensity values from image sensor photodetectors in the same row.

13. The optical navigation method of claim 9 wherein the first image data is obtained before the second image data is obtained.

14. The optical navigation method of claim 9 wherein the cross-correlating of the per-column sums is a one-dimensional cross-correlation and wherein the cross-correlating of the per-row sums is a one-dimensional cross-correlation.

15. The optical navigation method of claim 9 wherein the first image data and the second image data are obtained from a two-dimensional photodetector array.

16. The optical navigation method of claim 15 wherein the first and second image data comprises digital image data.

17. A system for processing image data for optical navigation comprising:

an image sensor comprising an array of photodetectors, the array of photodetectors comprising an m×n array of photodetectors with m being greater than one and n being greater than one, the image sensor being configured to obtain first image data and second image data;

a pre-processing hardware circuit configured to sum intensity values of the first image data and the second image data on a per-column basis and on a per-row basis;

a one-dimensional cross-correlation hardware circuit configured to cross-correlate the per-column sums of the first image data and the second image data and to cross-correlate the per-row sums of the first image data and the second image data; and relative displacement logic configured to determine the relative displacement between the first and second image data in a first direction in response to the cross-correlation of the per column sums and to determine the relative displacement between the first and second image data in a second direction in response to the cross-correlation of the per-row sums and to use the relative displacement in the first and second directions to track the movement of an optical navigation system relative to a navigation surface.

18. The system of claim 17 wherein:

the first direction is perpendicular to the columns over which the per-column intensity values are summed; and the second direction is perpendicular to the rows over which the per-row intensity values are summed.

19. The system of claim 17 wherein summing the intensity values on a per-column basis comprises adding the intensity values from image sensor photodetectors in the same column and wherein summing the intensity values on a per-row basis comprises adding the intensity values from image sensor photodetectors in the same row.

20. The system of claim 17 wherein the cross-correlating of the per-column sums is a one-dimensional cross-correlation and wherein the cross-correlating of the per-row sums is a one-dimensional cross-correlation.

* * * * *